April 10, 1973 R. L. SOMERVILLE 3,726,647
APPARATUS FOR THE PRODUCTION OF PHOSPHORIC ACID
Filed Feb. 11, 1971 2 Sheets-Sheet 2
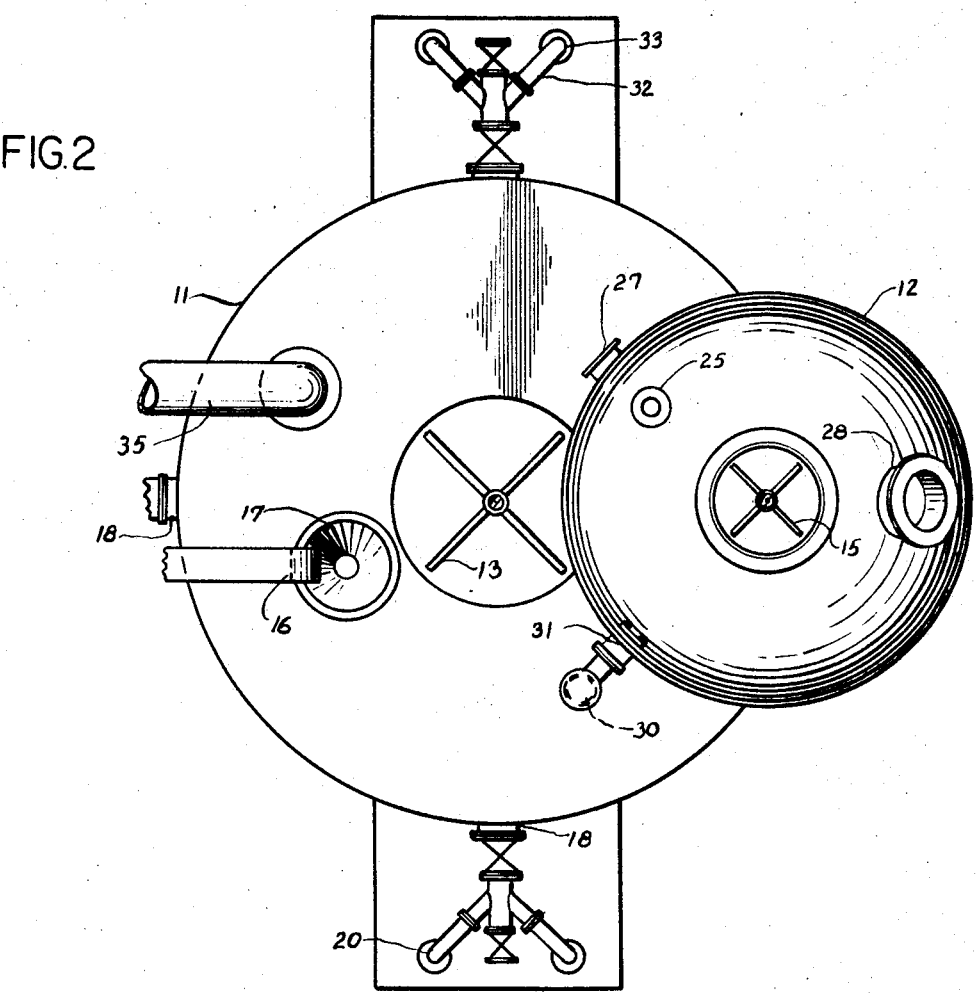
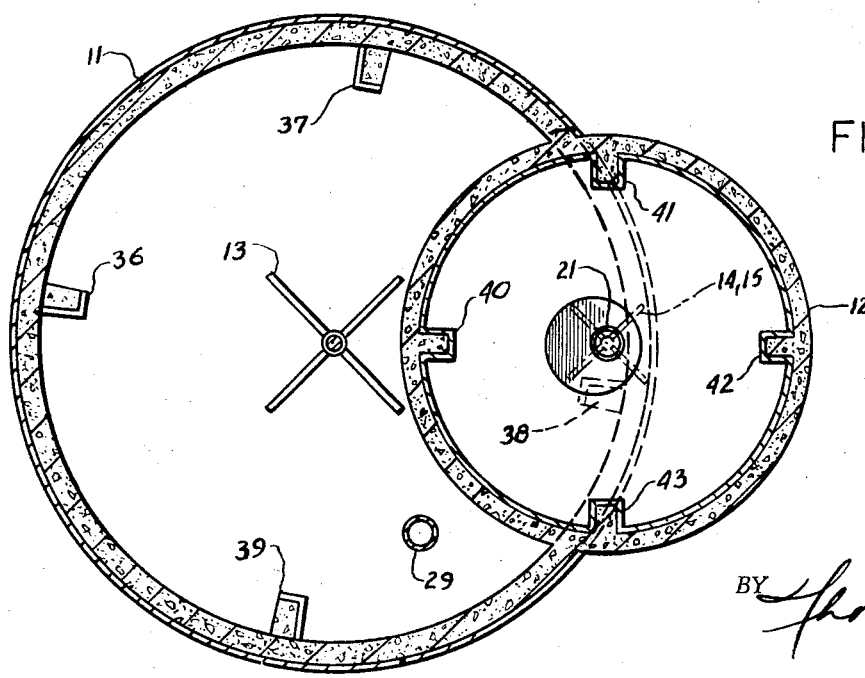
INVENTOR.
ROBERT L. SOMERVILLE
BY
ATTORNEY United States Patent Office 3,726,647
Patented Apr. 10, 1973

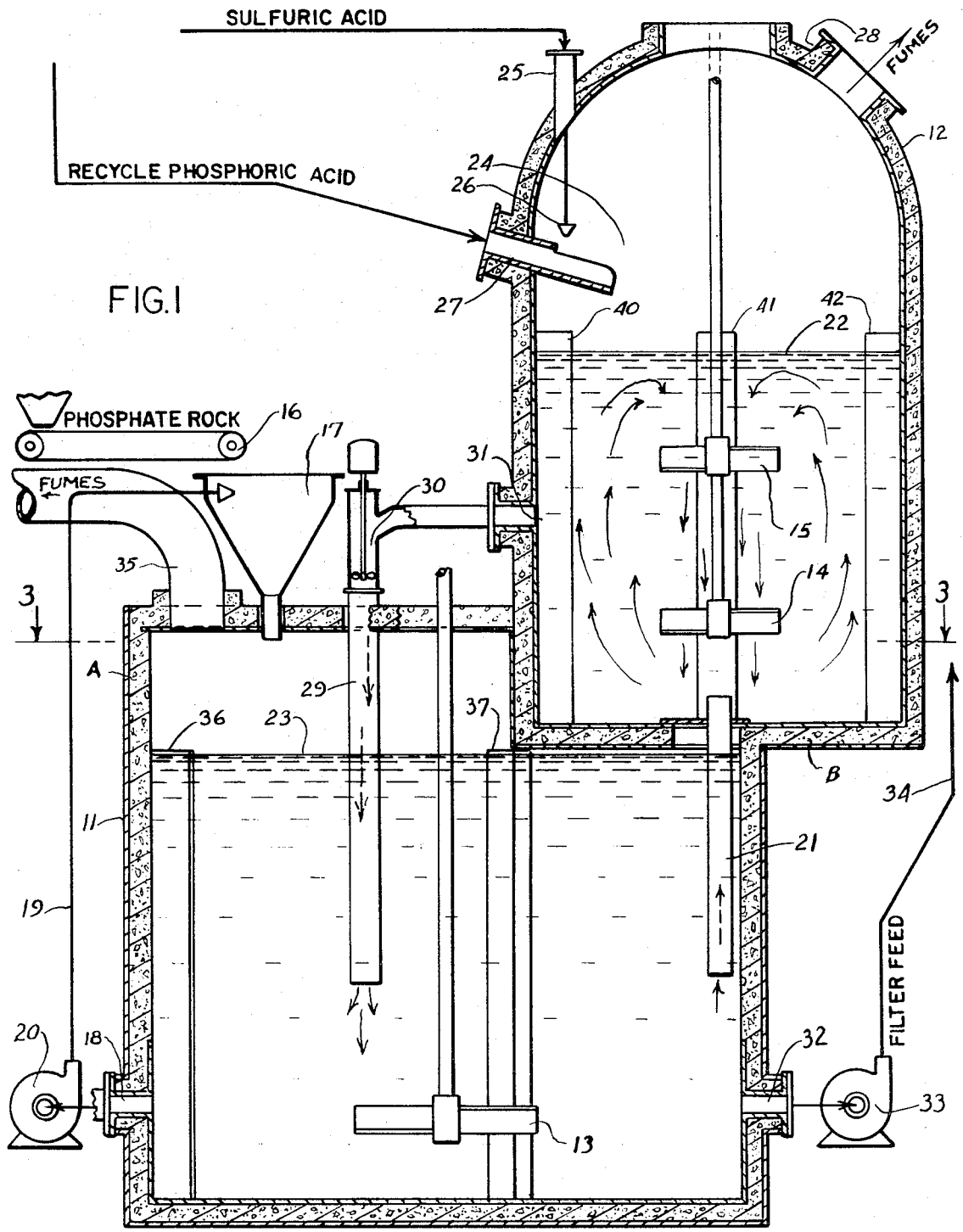

3,726,647
APPARATUS FOR THE PRODUCTION OF
PHOSPHORIC ACID
Robert L. Somerville, Rte. 1, P.O. Box 256, Old Amwell
Road, Neshanic, N.J. 08853
Filed Feb. 11, 1971, Ser. No. 114,506
Int. Cl. C01c 1/46; C01b 25/22
U.S. Cl. 23—259.2                                    6 Claims

ABSTRACT OF THE DISCLOSURE

A one-piece apparatus for the production of wet process phosphoric acid which comprises a lower digestion chamber for the basic reaction between the phosphate rock and the sulfuric acid, containing single means for mechanical agitation and baffles projecting from the inner walls of said lower chamber; and an upper vacuum crystallization chamber to remove heat of reaction and promote gypsum crystal growth containing means for mechanical agitation, baffles projecting from the inner walls of said upper chamber, liquid inlet means extending below the liquid level in the lower chamber for introducing the hot slurry into said crystallizer, liquid return means for returning the cooled slurry to the digestor and varied inlet and outlet means.

BACKGROUND OF THE INVENTION

The so-called wet process for producing phosphoric acid has been extensively used because of its simplicity and economic operation. Phosphate rock is treated according to this process with sulfuric acid to produce a slurry of soluble phosphoric acid and isoluble calcium sulfate (gypsum). The slurry is then filtered and the resulting phosphoric acid filtrate may then be concentrated for the production of triple superphosphate of other phosphatic fertilizer material.

The production of phosphoric acid by such a reaction is an exothermic process which generates relatively large amounts of heat in the reaction material. It is well known that much of this heat must be dissipated in order to maintain efficient operations and to obtain the gypsum by-product in a crystalline form which permits it to be efficiently filtered.

Aside from the purely economic or engineering difficulties which may be experienced in attempting rapidly to remove large quantities of heat from large volumes of liquids by conventional methods such as air cooling or flash evaporation or indirect heat exchanger cooling, additional difficulties may be encountered when a rapid and substantial temperature drop induces undesired precipitation of suspended or dissolved materials from the liquid being cooled or induces precipitation of an undesired type or size of precipitate crystal or induces precipitation at an undesired point in the process or under such conditions as to form scaling or other disadvantageous conditions.

With regard to gypsum filtration, product losses in the wet process operation for the manufacture of phosphoric acid are directly related to the efficiency of the filtration and working operations. Thus, it is known that recoveries of the phosphoric acid product are inversely related to the number of gypsum crystals produced and directly related to the size of such crystals.

Various procedures and apparatus have been disclosed for improving the efficiency of operation and equipment used in the manufacture of phosphoric acid. Included among such disclosures are U.S. Pats. 2,699,985; 2,887,362; 3,416,889; 3,257,168; and 3,403,528, as well as various phosphoric acid texts. For example, the latter two patents disclose a process for the manufacture of phosphoric acid and an apparatus for accomplishing same which consists of an arrangement for the high temperature reaction of the phosphate rock and sulfuric acid in one reaction stage in which the materials are highly corrosive, subjecting the material from the hot reaction stage to a vacuum cooling step in accordance herewith in which the temperature of the material is decreased substantially (e.g., of the order of 20° F.) under conditions of controlled cooling whereby gypsum and other components which precipitate from the hot reaction slurry are caused to precipitate and grow slowly upon existing nuclei cooling rather than to precipitate on the walls of the cooler apparatus to form scale, and then subjecting said cooled material to a further digesting or precipitating step during which gypsum and other precipitating materials come out of solution as slowly grown large crystals of the desired crystal form rather than as a larger number of smaller crystals more difficult to separate in a subsequent filtering operation for the removal of precipitated by-products from the desired phosphoric acid product.

While the various prior art processes have substantially improved the manufacturing techniques, the apparatus utilized for conducting such processes have exhibited certain deficiences. Thus, often they have extensive space requirements due to the large number of pre-mix and reaction tanks utilized therein; they have problems of mechanical stresses in the various connections between the tanks; they have not provided the means for adding sulfuric acid to the system without disrupting existing gypsum crystalline formation; they have generated an inferior gypsum by-product, and the like.

SUMMARY OF THE INVENTION

The primary object of this invention is to provide an improved apparatus for the manufacture of phosphoric acid by the wet process technique.

Another object is to provide a one piece apparatus for conducting the process thereby requiring less space and expense as well as easier operation and cleaning than conventional installations.

A further object is to provide an improved apparatus which insures the formation of large and uniform gypsum crystals and which provides controlled liquid cooling and temperature maintenance.

Various other objects and advantages of this invention will become apparent from the following detailed description thereof.

I have now found that the deficiencies in the prior art apparatus for manufacturing wet process phosphoric acid may be overcome by utilizing a one-piece apparatus which combines a primary reaction vessel for digestion of the phosphate rock and a vacuum crystallization chamber for removing the heat of reaction and promoting gypsum crystal growth. In addition to its one-piece construction, this apparatus is highlighted by its facility for blending sulfuric acid and weak recycle acid in the crystallization chamber where the temperature is lowest and the gypsum most stable rather than in the primary digester thereby inducing a major portion of the crystal growth to occur in an environment high in free sulfuric acid resulting in the formation of gypsum having very little co-crystallized phosphate; and, its provision for vacuum introduction of the hot slurry into the crystallization chamber and the corresponding pumping means for returning the cooled slurry to the digester. The apparatus thereby represents a two temperature leach system with all of the advantages and ability to produce large, easily filtered crystals inherent in system operating with recycle between two widely separated temperature levels, yet maintaining the advantages and simplicity of a single tank reactor.

The invention is more specifically defined in the appended claims read together with the following description and the accompanying drawings thereof in which:

FIG. 1 is a diagrammatic view of the apparatus representing the preferred embodiment of the invention;

FIG. 2 is a top view of the preferred apparatus depicting the orientation and spatial relationships of the components thereof; and, FIG. 3 is a plan sectional view taken along line 3—3 of the apparatus of FIG. 1 depicting solely the positioning of the baffles therein.

DESCRIPTION OF THE PREFERRED EMBODIMENTS

The apparatus of this invention is directed to a phosphoric acid process wherein the acid digestion and desired precipitation phases are operated at two different levels with controlled cooling therebetween but under circumstances where undesired scaling precipitation is avoided in the cooler apparatus and where large easily filtered crystals of precipitated material are formed by relatively slow crystal growing techniques. Thus, the digesting step is conducted at high temperature of 185° F. In a primary reaction tank for the digestion or solubilizing or extraction of $P_2O_5$ from the phosphate rock starting material, and, thereafter, the reaction mixture is continuously lead through a cooling step where the temperature is reduced 30°–35° F. by rapid mixture with previously cooled slurry, thereby avoiding undesired scaling precipitation on the walls of the cooler and/or formation of undesired gypsum precipitate crystals of small size; thereafter the cooled slurry is returned to the digester for further formation of readily filterable gypsum crystals of the size and type desired for subsequent filtration and working.

Fundamental concepts to be observed include:

(1) Rapid dispersion of phosphate rock in the digestion stage in order to avoid local deficiency of sulfate ion in the system.

(2) Thorough dilution and cooling of sulfuric acid prior to mixing with slurry and rapid dispersion of acid in a relatively cool slurry to avoid dehydration and damage to gyspum crystals.

(3) Subjecting a circulating system of cool slurry to a relatively high sulfuric acid concentration in order to reduce the phosphate content of the gypsum.

(4) Utilizing the cool slurry to control the temperature of the slurry during the digestion stage.

With reference to the drawings, there is indicated in FIG. 1 a system for a phosphoric acid process in accordance herewith and including as primary elements thereof, a digestion chamber 11 and a vacuum crystallization cooler 12. Digester 11 and cooler 12 are equipped with agitators respectively indicated at 13, 14, 15, driven in known manner as by motors or drive means (not indicated) for maintaining agitation and continuous homogeneous admixture of the liquids or slurries in the respective tanks. Phosphate rock, crushed and prepared in known or conventional manner, enters the system through a suitable conveying means indicated generally at 16, and is mixed in wetting cone 17 with hot slurry emanating from the digester 11 at outlet 18 and passed to said vortex cone 17 through line 19 under action of pump 20. The mixing of the rock and slurry in the cone 17 eliminates dusting over the surface of the digester 11 and rapidly disperses the rock in a mother liquor which is essentially the same as the product acid.

A single agitator 13 is utilized in the digester for several reasons. Initially, the agitation pattern in a baffled tank is completely predictable. Such predictability is disrupted if multiple agitators are used inasmuch as transient flows between agitators may cause large unbalanecd forces. Secondly, a single agitator is more reliable than a multiple agitator system. Finally, the predictable flow insures top to bottom mixing and orderly rotation of the tank contents so that materials can be easily added and withdrawn from the digester.

After the desired mixing and holding time in the digester 11, where any fluorine vapor evolved has been withdrawn through vent 35, the hot digested slurry (approximately 185° F.) is drawn by vacuum through draft tube 21 into the vacuum crystallizer cooler 12. The hot slurry enters at the bottom of cooler 15 and is pulled into the eye of the lower of the two axial flow agitators 14. The agitator action induces a large violent circulation from the bottom to the surface of the slurry, depicted by the pattern of arrows in FIG. 1. Thus, the hot slurry is rapidly cooled from about 185° F. to about 150° F. by being blended with previously cooled slurry so that precipitation occurs on the surface of the existing crystals and not on the chamber surfaces. A nearly ideal environment for crystal growth is provided.

The size and capacity of cooler 12, and the pumping or recycling capacity of agitators 14, 15 therein are all correlated with the volume and temperature of slurry entering through tube 21 in order to maintain a pumping circulation rate or volume within cooler 12 substantially in excess of the rate of entering hot slurry. Thus, a substantial or predominant part of the cooling of hot slurry is accomplished by admixture and direct heat exchange with cooler slurry already present in cooler 12 by constant recirculation and mixing of the liquid materials therein and so that only a slight temperature drop (e.g., less than 2° F.) occurs by evaporation of any particular increment of the mixed slurry at surface 22 of the liquid within cooler 12, although the liquid at this surface and subject to evaporation is constantly changing through recirculation so that a large total amount of heat is removed to accomplish the entire temperature decrease desired, as previously indicated. An absolute pressure ranging from about 125 to 175 mm. Hg is maintained within cooler 12.

The typical spatial relationship of digester 11 and cooler 12 within the unitary apparatus is depicted in FIG. 1 and FIG. 2. It is to be noted that the respective chambers are positioned in an askew relationship in order to provide sufficient room for the independent positioning and operation of the hardware acting on the digester 11. As previously indicated, such an all-inclusive unit requires less space and expense as well as easier operation and cleaning than conventional installations. The unit provides adequate support for the cooler 12 and avoids the mechanical stresses which are frequently encountered when components of a multi-component system are widely separated. The base of the cooler 12 may be positioned as close to the liquid level 23 in the digester 11 as is desired. The draft tube 21 may extend into the digester 11 to any desired depth below the liquid level. Likewise, the length of draft tube 21 which extends into the cooler 12 should be selected in order to maximize the violent circulation of slurry to the surface and the subsequent cooling.

Although a wide variety of constructions may be utilized for the digester 11 and the vacuum crystallizer 12, in accordance herewith, satisfactory results are achieved by constructing them in the form of closed acid resisting concrete tanks lined, if desired, with carbon brick laid in resin mortar particularly in those areas of the tanks on which directly impinge streams of flow created by agitators 13, 14, 15. Both the digester 11 and the vacuum cooler 12 contain equally spaced baffles 36, 37, 38, 39, 40, 41, 42, 43 projecting inwardly from the walls of the respective tanks, these baffles being depicted in FIG. 3. The baffles will also be faced on their front and on at least one side with carbon brick to prevent erosion. The baffles serve to prevent short circuiting of the slurry flow between points of inlet and outlet. The overall size of the digester 11 and the cooler 12 are readily determined depending upon the desired capacity and the throughput rate of the reactants.

For example, satisfactory results are obtained with the digester being dimensioned to hold approximately 80,000 gallons of slurry and provide nearly four hours holding time. The dimensions of the vacuum crystallizer are then correlated to these conditions when producing about 250 tons of $P_2O_5$ in the product.

The free space 24 above the slurry in the vacuum cooler 12 is utilized to mix concentrated sulphuric acid with weak recycle acid, dispose of the heat of dilution by evaporation and disperse the droplets of the resulting mixture onto the slurry surface at the coldest point in the system. The premixing and addition of sulfuric acid to the slurry at the coldest point in the system eliminate crystal degradation resulting from local concentrations of excessively strong sulfuric acid, and at the same time subject the slurry to a very high free sulfuric acid concentration for an appreciable period but at a temperature too cold to permit dehydration of the gypsum crystals. The free volume results in low vapor velocities that permit entrained liquids or slurry to fall back into the reaction mass.

The concentrated sulfuric acid enters the vacuum cooler 12 through inlet 25 and spray nozzle 26. The recycled weak phosphoric acid (30%) enters the cooler 12 through trough 27 whereupon it is admixed with the sulfuric acid in the space 24 above the slurry. The addition of sulphuric acid in the vacuum cooler 12 creates a slurry with about a 5 to 7% concentration of free sulphuric acid, as compared with 1.5 to 2.2% acid in the digester 11. The resulting solution in the vacuum cooler 12 is supersaturated with respect to the calcium sulphate and accordingly a large portion of the calcium sulphate crystallizes out. Since the sulphate produced under these conditions crystallizes with reduced substitution of $HPO_4^{2-}$ in the gypsum lattice (less than 0.2% $P_2O_5$ as dicalcium phosphate), a substantial increase in $P_2O_5$ recovery results. It is thus seen that this approach solves one of the most difficult problems of a wet process acid plant, namely, the addition of sulfuric acid to a gypsum-phosphoric acid slurry without disrupting existing gypsum crystals by sudden dehydration, excessive local temperatures, and the like.

The premixing of concentrated sulfuric acid and recycle acid in the vacuum cooler 12 also results in a large proportion of fluorine being evolved from the acid as a vapor. The fluorine vapor is withdrawn through outlet 28 and conducted to a conventional fume scrubber or barometric precondenser (not shown). Such increased evolution vapor in the cooler 12 results in less fluorine contamination in the product acid and simplifies the recovery of fluorine where such recovery is justified economically or where it is required as a pollution control measure.

The cold sulfuric-laden slurry from the vacuum cooler 12 is returned to the primary digester 11 where its reduced sensible heat content serves to control the primary digester temperature. A continuous reservoir is therefore provided for cooled digester slurry to be recycled into the primary digester 11 for the ready control of temperature therein, so that, despite substantial temperature rise in the digestion step because of heat of reaction and heat of solution of the materials therein, a desired maximum temperature can be relatively automatically arranged in the primary digestion, merely by controlling the recycled quantities of cooler slurry. Thus, the primary digestion may be continued at temperature levels below those which favor the production of the calcium sulfate hemi-hydrate which, as well understood, may introduce difficulties of scale formation or washing or filtering.

The slurry is returned to the primary digester 11 through tube 29 under action of any functional pump system 30. Generally, the pump will be mounted so as to pump vertically downward taking suction from the side 31 of the vacuum crystallizer 12 and discharging beneath the slurry surface in the digester 11. In order to maintain the proper temperature in the digester 11, a rate of slurry return which is approximately four times greater than the filter feed rate, i.e. the rate at which slurry is removed from digester 11 for filtration is desirable. Correspondingly, the speed of the return pump 30 may be varied automatically to control the flow from the vacuum crystallizer 12, this approach being vastly superior to the conventional overflow return techniques. After the desired additional residence time in the digester 12, the slurry, including the precipitated material suspended therein under the action of agitator 13 is withdrawn from digester 11 via outlet 32, thereof and conducted, under the action of pump 33, through line 34 to the subsequent filtering and washing and purification steps of the process, which may be satisfactorily operated in known or conventional manner as well understood, to yield a 30% or 32% $P_2O_5$ wet process acid.

As previously indicated, a portion of the slurry in the digester is also returned to the vortex cone 17 to provide slurry for admixture with phosphate rock. The recirculation of this reacted slurry serves to increase the dispersion of phosphate rock and sulphuric acid and also assists in the growth of larger and more filterable gypsum crystals. Furthermore, the gypsum quality for by-product purposes, such as gypsum board, or at retarder in portland cement production, is comparable to that produced by other recrystallizing processes without encountering the complexities and disadvantages of such processes.

The instant invention contemplates other arrangements than the one shown as regards means for temperature control, means for agitation, pumping devices, and the like. It should be noted, however, that the one piece construction, the use of vacuum to introduce the slurry into the cooler and the use of pumping means to return the slurry, and the mechanism for introducing sulfuric acid and recycle acid into the vacuum cooler are essential elements which must be retained in any comparable construction.

It should further be noted that the versatility of the subject apparatus enables it to be used in a variety of phosphoric acid processes, and to provide the practitioner with several options for process modification or expansion. For example, with reference to FIG. 1, the installation of an additional sulfuric acid-recycle phosphoric acid feed system 25, 26, 27 at location A in digester 11 and an alternate filter feed system 32, 33, 34 at location B in the base of cooler 12, enables the apparatus to be utilized in the production of calcium sulfate hemihydrate and strong phosphoric acid (40–45% $P_2O_5$) when the operating temperature in digester 11 is increased to 200°–215° F. and the operating temperature in cooler 12 is increased to 175–185° F.

Additionally the modified apparatus can be used for conducting either the first or second stage of a hemihydrate recrystallization process wherein the hemihydrate is produced in the first stage and gypsum in the second stage of the process. Such a process is described in the article entitled "New Process for Phosphoric Acid" by Chelminski and Somerville, which appeared in the May, 1966 issue of Chemical Engineering Progress.

Summarizing, this invention is thus seen to provide a novel apparatus for the production of wet process phosphoric acid. It should be understood that the present invention is not limited to the embodiments specifically described herein but extends to equivalent embodiments utilizing the principles herein disclosed as defined by the following claims.

What is claimed is:

1. A one-piece apparatus for the production of wet process phosphoric acid which comprises
   (a) a lower digestion chamber for the basic reaction between phosphate rock and sulfuric acid comprising single means for mechanical agitation, a plurality of vertical aligned baffles equally spaced along the inner wall of said chamber and projecting inwardly therefrom, and outlet means for withdrawing the reaction slurry therefrom; and affixed to said lower chamber, on top thereof and with center offset from said lower chamber, (b) an upper vacuum crystallization chamber to remove heat of reaction and promote crystal growth comprising means for mechanical agitation, a plurality of vertically aligned baffles equally spaced along the inner wall of said chamber and projecting inwardly therefrom, vacuum means for maintaining in said chamber a vacuum above the surface of liquid therein effecting heat removing evaporation of said liquid, means for introducing and mixing sulfuric acid and recycle phosphoric acid in the free space above the liquid in said upper chamber, vacuum means for raising the hot reaction slurry from said lower chamber into said upper chamber, pumping means for returning cool slurry to said lower chamber at a flow rate substantially in excess of the rate at which reaction slurry is withdrawn from said lower chamber for filtration, and outlet means for withdrawing vapor generated in said upper chamber.

2. The apparatus of claim 1, wherein a draft tube is the conduit for the passage of said hot reaction slurry from said lower chamber into said upper chamber.

3. The apparatus of claim 1, wherein said means for mechanical agitation in said upper chamber are a pair of axial flow agitators.

4. The apparatus of claim 1, wherein spray means is located in the free space above said reaction slurry in said upper chamber substantially adjacent the inlet means for introducing recycle phosphoric acid for introducing said sulfuric acid into said free space in a finely dispersed form which enables immediate and uniform blending of said sulfuric acid with said recycle acid.

5. The apparatus of claim 1, wherein said pumping means for returning cool slurry to said lower chamber from said upper chamber is mounted so as to pump vertically downward taking suction from the side of said upper chamber and discharging beneath the slurry surface in said lower chamber.

6. The apparatus of claim 5, wherein said pumping means returns said cool slurry to said lower chamber at a flow rate approximately four times greater than the rate at which reaction slurry is withdrawn from said lower chamber for filtration.

References Cited

UNITED STATES PATENTS

| | | | |
|---|---|---|---|
| 3,522,003 | 7/1970 | Lopker | 23—165 |
| 3,416,889 | 12/1968 | Caldwell | 23—165 |
| 3,257,168 | 6/1966 | Chelminski | 23—165 |

JAMES H. TAYMAN, Jr., Primary Examiner

U.S. Cl. X.R.

23—285; 423—320; 159—25 A